J. S. SWANN & J. H. CONNELL.
Fluid-Meters.

No. 148,994.                                Patented March 24, 1874.

Witnesses:
H. H. Dodge
J. B. Husted

Inventor:
J. S. Swann
J. H. Connell
By their atty's
Dodge & Son

UNITED STATES PATENT OFFICE.

JOHN S. SWANN AND JOHN H. CONNELL, OF CHARLESTON, W. VA.

IMPROVEMENT IN FLUID-METERS.

Specification forming part of Letters Patent No. 148,994, dated March 24, 1874; application filed March 3, 1874.

*To all whom it may concern:*

Be it known that we, JOHN S. SWANN and JOHN H. CONNELL, of Charleston, in the county of Kanawha and State of West Virginia, have invented certain Improvements in Fluid-Meters, of which the following is a specification, reference being had to the accompanying drawings.

Our invention relates to water-meters; and the invention consists in constructing a rotating cylinder, with hinged wings, in such a manner that there shall be a chamber in the cylinder under each wing, when the latter is folded against the cylinder, with an opening for the water to enter said chamber, so as to equalize the pressure on opposite sides of the wings, and cause them to open more readily; and in providing the case with an eccentric abutment, arranged to prevent excessive wear by friction on the wings, all as hereinafter more fully explained.

Figure 1:
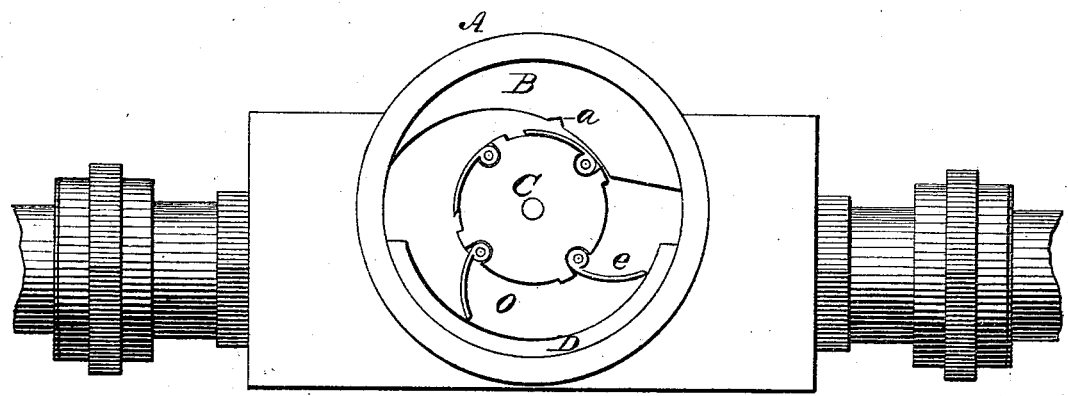
Figure 2:
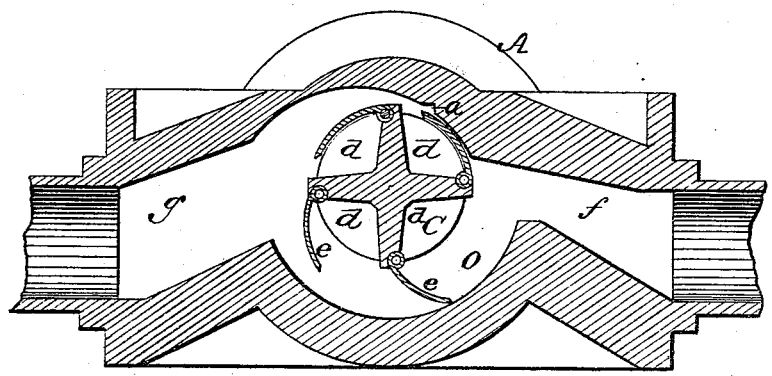

Figure 1 is a side elevation of the meter, with one of the side plates removed to show the interior. Fig. 2 is a longitudinal section of the same, taken through the center.

The object of our invention is to provide a meter that will operate to measure, with uniformity and accuracy, the quantity of water that passes through it whatever the pressure, and that can be readily attached to water pipes or faucets, and at small expense.

In constructing our meter, we first provide a case, A, which has within it a cylindrical chamber, O, as shown in Figs. 1 and 2. Within this chamber, at its upper side, we arrange an abutment, B, which extends across the chamber from end to end, and the inner face of which is eccentric to the walls of the chamber, as shown in Figs. 1 and 2, there being a recess, *a*, formed in the face of this abutment, near its rear end, for the reception of sand or other foreign material, which would otherwise be apt to be carried along between the wings and the face of the abutment, and thereby wear these parts, and ultimately to form an open passage between them at the heel of the abutment. We then provide a cylinder, C, which has pivoted to it a series of curved wings, *e*, as shown in the drawings, this cylinder and its wings being of such a length as to reach from end to end of the chamber O, and fitted to revolve freely therein on bearings in the sides of the case A, one of the journals extending through to the outside for the purpose of connecting it with a registering apparatus. The cylinder C we construct with circular heads or ends, and between these, in its sides or periphery, we make, opposite each wing, a cavity or chamber, *d*, of such a width that when the wing *e* is folded over it the wing will not entirely cover or close the chamber, but will leave an open space along the free end of the wing, as shown in Fig. 2, the object of this being to admit the water between the wing and cylinder, thereby equalizing the pressure on opposite sides of the wing, and thus permit it more readily and freely to swing open as it comes around in front of the entering stream or current of water. As shown in Fig. 2, the chamber O has an inlet-passage, *f*, at one side, and an outlet-passage, *g*, at the opposite side, and, at the outer terminations of these passages, the case A will be suitably constructed for ready connection with the water-pipes generally used.

With the parts thus constructed, the operation will be readily understood. As the water enters the chamber O through the passage *f*, it will act upon the wings in front of it, and drive them along the lower concentric wall of the chamber, thereby causing the cylinder to revolve. The moment the wings come successively opposite the outlet-passage *g*, the water escapes through the same, and, as the cylinder revolves, the wing will gradually fold down upon the cylinder, so as to pass the abutment B.

By making the abutment eccentric, as shown, and of a gradual curve, it will be seen that as the cylinder revolves there will be a body of water between the outer face of the wing and the abutment at the time the wing has passed the mouth of the outlet-passage, and that this water will serve as a cushion to prevent the wing from being thrown, by centrifugal force, out against the face of the abutment, but that, on the contrary, the wing will be closed upon the cylinder by a very gradual and smooth movement, thereby avoiding the concussion and excessive wear that are apt to occur in this class of meters when made with an abrupt abutment.

It is obvious that the recess *a* may be omitted when the fluid to be measured is pure or free from foreign matter.

These meters may be made of any size required; and are simple, cheap, and not liable to get out of order.

Having thus described our invention, what we claim is—

1. The cylinder C, provided with a series of chambers, $d$, closed at their ends, and a corresponding series of hinged wings, $e$, of such width that, when folded over the chambers, an opening is left for the entrance of the fluid, substantially as described.

2. The case A, provided with the chamber O and abutment B, in combination with the cylinder C, provided with chambers $d$ and wings $e$, all constructed and arranged to operate substantially as and for the purpose herein set forth.

JOHN S. SWANN.
JOHN H. CONNELL.

Witnesses:
    JOHN W. GARCELON,
    THOS. L. BROWN.